(12) United States Patent
Matsumoto et al.

(10) Patent No.: US 6,528,168 B1
(45) Date of Patent: Mar. 4, 2003

(54) CARBON/SILICON CARBIDE COMPOSITE MATERIAL

(75) Inventors: Takashi Matsumoto, Kagawa (JP); Masaaki Kawakami, Kagawa (JP)

(73) Assignee: Toyo Tanso Co., Ltd., Osaka (JP)

( * ) Notice: Subject to any disclaimer, the term of this patent is extended or adjusted under 35 U.S.C. 154(b) by 0 days.

(21) Appl. No.: 09/381,645

(22) PCT Filed: Mar. 30, 1998

(86) PCT No.: PCT/JP98/01427
§ 371 (c)(1),
(2), (4) Date: Sep. 29, 1999

(87) PCT Pub. No.: WO98/43928
PCT Pub. Date: Oct. 8, 1998

(30) Foreign Application Priority Data

Mar. 31, 1997 (JP) .............................................. 9-080436

(51) Int. Cl.$^7$ .............................................. C04B 41/87
(52) U.S. Cl. ........................ 428/408; 277/404; 277/405; 277/592; 277/650; 428/332; 428/698; 428/446; 508/100; 508/154
(58) Field of Search ................................ 428/408, 688, 428/698, 446, 332; 508/100, 154; 277/404, 405, 592, 650

(56) References Cited

U.S. PATENT DOCUMENTS

| | | |
|---|---|---|
| 5,419,889 A | 5/1995 | Matsumoto et al. |
| 5,783,255 A | 7/1998 | Suda et al. |

FOREIGN PATENT DOCUMENTS

| | | | |
|---|---|---|---|
| EP | 0176055 | * | 4/1986 |
| JP | 50-92889 | | 7/1975 |
| JP | 2-271963 | * | 2/1980 |
| JP | 53-182213 | | 10/1984 |
| JP | 63-25273 | * | 2/1988 |
| JP | 63-40763 | | 2/1988 |
| JP | 1-286981 | * | 1/1989 |
| JP | 1-265203 | | 10/1989 |
| JP | 3-23209 | | 1/1991 |
| JP | 3-177384 | | 8/1991 |

OTHER PUBLICATIONS

Patent Abstracts of Japan, vol. 1995, No. 09, Oct. 31, 1995, JP 07 144982, Jun. 6, 1995.
Derwent Publications, AN 1996–112545, JP 8 012474, Jan. 16, 1996.
T–M. Wu, et al., Ceramics International, vol. 18, No. 3, pp. 167 to 172, "The Effect of Boron Additive on the Oxidation Resistance of SiC–Protected Graphite", 1992 (No month).

* cited by examiner

Primary Examiner—Archene Turner
(74) Attorney, Agent, or Firm—Oblon, Spivak, McClelland, Maier & Neustadt, P.C.

(57) ABSTRACT

A carbon/silicon composite material wherein a silicon carbide containing carbon layer which is formed by silicon and boron carbide being penetrated from a surface of a carbon substrate into the inside thereof to allow the silicon and carbon of the carbon substrate to react with each other so as to be converted into silicon carbide and in which the silicon carbide is dispersed generally uniformly along a depth direction is formed on the carbon substrate as a first layer, the silicon carbide containing carbon layer having a thickness of not less than 1 mm.

19 Claims, 9 Drawing Sheets

FIG. 2

| | Properties of die for continuous casting | | | | | | | Results | |
|---|---|---|---|---|---|---|---|---|---|
| | Bulk density (g/cm³) | Mean pore radius (μm) | Bending strength (kgf/cm²) | Thermal conductivity (kcal/hr m °C) | Depth of SiC layer (mm) | Thermal conductivity after conversion into SiC (kcal/hr m °C) | Surface roughness (Ra) (μm) | Time that elapsed before elimination due to surface roughness of cast block (hr) | Number of pinholes in the inside of die after use | Number of repetitions to be performed by re-polishing |
| Example 1 | 1.77 | 1.8 | 440 | 100 | 6.0 | 95 | 0.75 | 60 | a few | 2 |
| Example 2 | 1.82 | 1.7 | 500 | 60 | 4.0 | 60 | 0.75 | 75 | a few | 1 |
| Example 3 | 1.90 | 2.0 | 550 | 120 | 2.0 | 115 | 0.75 | 100 | N/A | 1 |
| Comparative Example 1 | 1.77 | 1.8 | 440 | 100 | 0.5 | — | 5.0 | 20 | many | 0 |

FIG. 3

| Characteristic of isotropic graphite used for carbon substrate | Depth of SiC layer (mm) | |
|---|---|---|
| | (Example) | (Comparative Example) |
| (Bulk density: 1.77g/cm³)<br>(Mean pore radius: 1.5μm)<br>(Bending strength: 450 kgf/cm²) | (Example 4)<br>5.5 | (Comparative Example 2)<br>2.8 |
| (Bulk density: 1.82g/cm³)<br>(Mean pore radius: 1.0μm)<br>(Bending strength: 780 kgf/cm²) | (Example 5)<br>3.0 | (Comparative Example 3)<br>0.5 |
| (Bulk density: 1.90g/cm³)<br>(Mean pore radius: 0.15 μm)<br>(Bending strength: 950 kgf/cm²) | (Example 6)<br>1.0 | (Comparative Example 4)<br>0 |

| Section in illustration | Component | Area ratio(%) |
|---|---|---|
| Cross hatched section | C | 65 |
| White section | SiC | 35 |

FIG. 10

| | Mean pore radius (μm) | Depth of SiC layer (mm) | Abrasion loss of counter-member (SiC) (μm/hr) | Abrasion loss of specimen (μm/hr) | Appearance of specimen |
|---|---|---|---|---|---|
| Example 4 | 1.5 | 5.5 | 0 | 0 | Crack<br>No Si retention |
| Example 5 | 1.0 | 3.0 | 0 | 0 | Crack<br>No Si retention |
| Example 6 | 0.15 | 1.0 | 0 | 0 | Crack<br>No Si retention |
| Comparative Example 2 | 1.5 | 2.8 | 0 | 0.02 | Crack<br>No Si retention |
| Comparative Example 3 | 1.0 | 0.5 | 0 | 0.03 | Si retention |
| Comparative Example 4 | 0.15 | 0 | — | — | — |

CARBON/SILICON CARBIDE COMPOSITE MATERIAL

TECHNICAL FIELD

The present invention relates to a carbon/silicon carbide composite material, excellent in residence to wear, to be used for members for continuous casting or sliding members.

PRIOR ART

A carbon substrate is used for a member for continuous casting or a sliding member, because of its self-lubricating property and excellent residence to wear.

There is a limit to improvement in resistance to wear to be expected of the carbon substrate alone. For further improvement in the resistance to wear of the carbon substrate, a variety of surface treatment technologies have been proposed hitherto.

Japanese Laid-open Patent Publication No. Sho 62(1987)-270250 discloses means for converting a surface of the carbon substrate into a silicon carbide layer by the CVD (Chemical vapor deposition) method or the CVR (Chemical vapor reaction) method. However, the silicon carbide layer formed by the CVD method is disadvantageously liable to peel off, and the silicon carbide layer formed by the CVR method has a disadvantage of being lack of denseness. In addition, both the CVD method and the CVR method need large-scaled facilities. Accordingly, the both have not yet come to be commercially practical.

Japanese Laid-open Patent Publication No. Hei 8(1996)-12474 discloses means for converting a surface of carbon substrate into a silicon carbide containing carbon layer by a method of the surface of the carbon substrate being coated with slurry mixing resin and silicon powder and then being heat-treated at over 1,500° C., for the purpose of improving the resistance to wear of a sliding seal member. However, since the silicon powder being gasified under high temperature to be allowed to react with carbon forms the silicon carbide, it is hard for silicon gas to penetrate into the inside of the carbon substrate. Because of this, it was infeasible to obtain the silicon carbide containing layer uniformly penetrating into the inside. The material thus formed cannot be used for applications such as members for continuous casting or sliding members, which need to allow for costs resulting from machining or wearing.

Japanese Laid-open Patent Publication No. Hei 7(1995)-144982 discloses means for converting a surface of the carbon substrate into a silicon carbide containing layer and also forming a dense surface layer formed of silicon, ceramic and carbon, to produce a two-layer structure by a method of the surface of the carbon substrate being coated with slurry mixing resin, silicon powder and ceramic and then being heat-coated at over 1,500° C., for the purpose of improving oxidation resistance of a heat resisting member. However, since the surface layer is of thin, this material cannot be used for applications such as members for continuous casting or sliding members which need to allow for costs resulting from machining or wearing.

SUMMARY OF THE INVENTION

It is the object of the present invention to provide a carbon/silicon carbide composite material in which a deeply and uniformly penetrating silicon carbide containing carbon layer is formed as a first layer on a surface of a carbon substrate to produce a further improved wear resistance.

To accomplish the object, the inventors devoted themselves on the concerned study and discovered that when the slurry of silicon (Si) and boron carbide ($B_4C$) was used, the silicon was surprisingly penetrated deep into the inside of the carbon substrate, so that a deeper and uniform silicon carbide containing carbon layer (it is hereinafter referred to as the SiC/C layer) was formed. Based on this discovery, the inventors have completed the present invention.

The present invention is directed to a carbon/silicon carbide composite material wherein a silicon carbide containing carbon layer which is formed by silicon and boron carbide being penetrated from a surface of a carbon substrate into the inside thereof to allow the silicon and carbon of the carbon substrate to react with each other so as to be converted into silicon carbide and in which the SiC is dispersed generally uniformly along a depth direction is formed as a first layer, the silicon carbide containing carbon layer having a thickness of not less than 1 mm. Also, the present invention is directed to a carbon/silicon carbide composite material wherein the SiC/C layer is formed on the surface of the carbon substrate as the first layer, and boron compound is mixed with silicon carbide in the layer.

BRIEF DESCRIPTION OF THE DRAWINGS

FIG. 2 is a diagram showing results of continuous casting tests;

FIG. 3 is a diagram showing examining results of form depth of the SiC/C layer;

FIG. 10 is a diagram showing test results of a sliding performance testing machine.

DETAILED DESCRIPTION OF THE INVENTION

Figure 1:
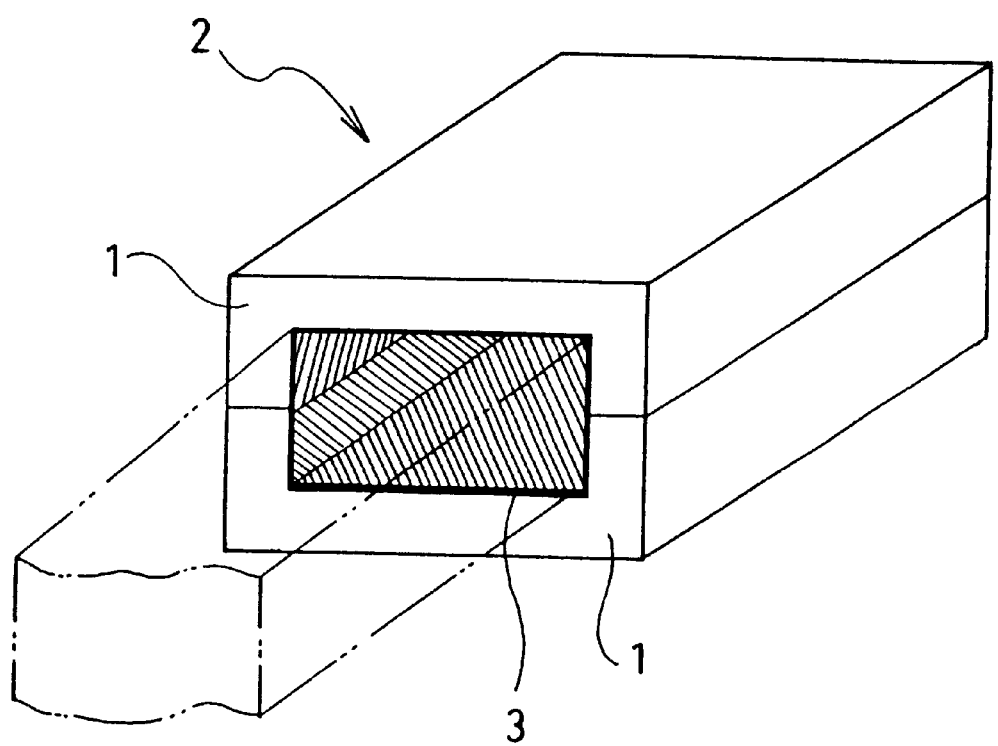
FIG. 1 is a schematic perspective view of a continuous casting die used in Examples 1 to 3.

Detailed description of the present invention will be given below.

The carbon/silicon carbide composite material of the present invention comprises a first layer of a SiC/C layer formed on a carbon substrate.

The carbon substrate used herein is formed of a graphite material, an isotropic graphite material and the like.

For applications for members for continuous casting, the carbon substrate desirably has a bulk density of not less than 1.70 (g/cm$^3$), a mean pore radius of not more than 2.5 ($\mu$m), a bending strength of not less than 300 (kgf/cm$^2$) and thermal conductivity of not less than 50 (kcal/hrm° C.), for holding a mechanical strength needed for the substrate and for fully cooling and solidifying. metals.

For applications for sliding members or equivalent, the carbon substrate desirably has the bulk density of not less than 1.77 (g/cm$^3$), the mean pore radius of not more than 1.5 ($\mu$m), and the bending strength of not less than 450 (kgf/cm$^2$), for. holding a high mechanical strength needed for the substrate. Further preferably, the carbon substrate has the bulk density of not less than 1.80 (g/cm$^3$), the mean pore radius of not more than 1.2 ($\mu$m), and the bending strength of not less than 700 (kgf/cm$^2$). This is for the purpose of allowing the silicon carbide containing carbon layer to have an adequate thickness, which is within an available range for the carbon substrate having a high mechanical strength. Further, this is because properties of products, such as oxidation resistance, impermeability, mechanical strength and wear resistance, can be further improved.

The SiC/C layer, in which the silicon carbide is generally uniformly dispersed along the depth direction, has a thickness of not less than 1 mm. A ratio of conversion into silicon carbide, which is expressed, by an area ratio of silicon carbide to carbon is determined in accordance with wear resistance required, though it is usually within the range of 50 to 30%. What is meant by the wording that the silicon carbide is generally uniformly dispersed along the depth direction is that a ratio between the ratio of conversion into silicon carbide in the vicinity of.a surface of the SiC/C layer and the ratio of conversion into silicon carbide in the vicinity of the inside of the same is within the range of 1/1 to 0.9. With this level of difference in the ratio of conversion into silicon carbide, even when the layer is shaved by machining or worn by wearing, the SiC/C layer that can fully exert its wear resistance capability can still be ensured.

Then, description on a method of forming the first layer of such a silicon carbide containing carbon layer will be given below.

The carbon substrate is coated with the slurry formed by 95–50 weight % silicon powder and 5–50 weight % boron carbide powder being dispersed in resin and then is heated at a temperature of not less than 1,500° C., at which silicon in the slurry is fused under an inert atmosphere at a pressure of not more than 10 Torr, preferably 2–5 Torr, to thereby form the SiC/C layer. In other words, the SiC/C layer is formed by making the silicon and boron carbide penetrate from the surface of the carbon substrate into the inside thereof to allow the silicon to react with carbon of the carbon substrate, so as to be converted into silicon carbide. The boron carbide improves wetting characteristics between the silicon powder and the carbon substrate to make the silicon uniformly penetrate deep into the inside of the carbon substrate, so that the SiC/C layer of not less than 1 mm in which the silicon carbide is generally uniformly dispersed along the depth direction is formed as the first layer.

The resin used is the one generally high in membrane-forming capability and low in actual carbon ratio. Particularly preferable is the one selected from the group of, for example, polyamideimide resin, polyvinyl alcohol resin and polyamide resin. Among others, polyamide-imide resin is further preferable. The resin is used in the state of being fused in solvent, such as d imethylacetamide, dimethylformamide, dimethyl sulfoxide or N-methyl-2-pyrrolidone.

Silicon powder having a mean particle diameter of about 30–50 ($\mu$m) and boron carbide powder having a mean particle diameter of about 4–20 ($\mu$m) are mixed and dispersed in the solution to form slurry. When the silicon powder and the boron carbide powder are mixed in the resin, a preferable ratio of the boron carbide powder to the silicon powder is 5–50 weight % of the boron carbide powder to 95–50 weight % of the silicon powder.

With the boron carbide of not more than 5 weight %, a little effect is just yielded by the mixing of the boron carbide powder. Specifically, when the carbon substrate is treated under high temperature in a vacuum furnace, the fused Si is incompletely penetrated into pores of the graphite, so that, after cooled, it remains as metallic Si in the state of being deposited on a surface of the graphite. Besides, it becomes hard to remove the deposited material. On the other hand, with the boron carbide powder of not less than 5 weight % contained, the fused Si is penetrated deep into the pores of the graphite, so that its reaction with the graphite proceeds to allow the conversion into silicon carbide, so as to form a deeper SiC/C layer. The present invention has been made, noting the boron carbide's function of improving wetting characteristics between the silicon powder and the carbon substrate. This function cannot be effectively performed to provide an increased depth of the SiC/C layer, without containing the boron carbide powder of not less than 5 weight %.

In this range, no residual material remains on the surface of the graphite as metallic Si. Although there remain residual materials of components of carbide of the resin used, silicon carbide and boron carbide, since they can be removed with ease, no problem is presented. However, with the boron carbide powder in excess of 50 weight %, an absolute quantity of silicon involved in the reaction for conversion into silicon carbide is reduced itself and, resultantly, the silicon carbide containing carbon layer cannot be formed to a practical depth.

The slurry thus prepared is applied to a part of or an entire surface of the carbon substrate via proper means, such as brushing, hand coating or immersion of a non-treated matter into the slurry. A surface layer of the carbon substrate at a coated part thereof is converted into the silicon carbide containing carbon layer having a deeper depth through a series of treatments from drying to heat treatment as discussed later. Thereafter, the carbon substrate is dried at about 300° C. for 2 hours to vaporize the solvent, so that the resin is completely cured.

Next, the carbon substrate is heat-treated under an inert gas atmosphere of not more than 10 Torr at a temperature rise speed of about 400° C./hr. After reaching about 1,550 to 1,600° C., the carbon substrate is kept for 30 minutes. No particular limitation is imposed on the heating means, and the heat-treatment may be performed by proper heating means. In this operation, the silicon component is fused to be penetrated deep into the pores of the carbon substrate, passing through the carbonized layer of the resin, so as to react with carbon, so as to be converted into silicon carbide.

The condition of not more than 10 Torr in the operation was introduced, substrate on the following consideration and experimental results. The previously developed technology by the inventors of this application produced very hard carbides of the silicon and resin that remained in the state of being deposited on the carbon/silicon carbide composite material after heat treatment. An analysis of the deposits showed that the carbides contained a high proportion of silicon. This was presumably because, since the atmospheric pressure in the heat treatment increased to about 20 Torr, due to which the superior Si component could not evaporate and also the inferior silicon component could not penetrate into the pores of the substrate smoothly, redundant silicon components accumulated in high concentration on the carbonized layer of the resin.

Accordingly, the inventors introduced such means as to reduce the silicon remaining in the carbonized layer of the resin and, at the same time, added boron carbide to the resin in order to improve the wetting characteristic, so that silicon could easily be penetrated into an entire surface of or a specific part of the carbon substrate. Further, the inventors conditioned the atmosphere so that the redundant silicon remaining on the surface layer of the carbon substrate could evaporate. In addition, the inventors conducted a variety of tests, setting up the hypothesis that a relative proportion of the boron carbide to silicon of the surface layer increases by an amount by which the silicon evaporates, as such can improve the wetting characteristic to further promote the penetration of the silicon, thus achieving the deepening of the SiC/C layer. It was found from those tests that the heat treatment under the condition of not more than 10 Torr, preferably 2 to 5 Torr, could produce a deepened SiC/C layer on the surface layer of an entire surface or at a specific part of a variety of high-intensity carbon substrates.

In the as-obtained carbon/silicon carbide composite material, carbides of the resin remain in the state of being deposited on the surface of the carbon substrate, so those deposits are removed therefrom. It is presumed that the boron carbide used for the purpose of improving the wetting characteristic are converted into boron compounds, which in turn are dispersed in the silicon carbide, so that a very small quantity of boron carbide are presented.

Next, description on the uses of the obtained carbon/silicon carbide composite material will be given. The SiC/C layer of the first layer of the carbon substrate has excellent wear resistance and oxidation resistance. For that, the carbon/silicon carbide composite material is used for parts for continuous casting susceptible to oxidation and wear. Also, for the excellent wear resistance of the SiC/C layer, the carbon/silicon carbide composite material is used for sliding members susceptible to wear. If not only sliding property but also sealing property are required, as mechanical seals or equivalent, the carbon substrate including the sliding portion may be impregnated with resin or metal to ensure impermeability. The SiC/C layer itself will become substantially impermeable at a suitable SiC ratio and, accordingly,, the SiC/C layer can be formed on the entire surface to ensure the impermeability.

Best Mode for Carrying out the Invention

While the present invention is described below not less specifically with reference to the following examples and comparative examples, the present invention are by no means limited to the following examples.

Description on application examples to members for continuous casting will be given first.

EXAMPLE 1

As shown in FIG. 1, an isotropic graphite having a bulk density of 1.77 ($g/cm^3$), a mean pore radius of 1.8 ($\mu$m), a bending strength of 440 ($kgf/cm^2$) and thermal conductivity of 100 kcal/hrm° C. (which is available from TOYO TANSO CO., LTD.) was machined into a rectangular die to form a carbon substrate 1. It is noted that the measurement value found by the mercury porosimeter (which is half the cumulative pore volume measured at a contact angle of 141.3° between mercury and specimen and at a maximum pressure of 1,000 $kgf/cm^3$) was introduced as the mean pore radius. 20 weight % solution in which polyamide-imide resin as a binder was dissolved in N-methyl-2-pyrrolidone was used as a dispersion medium. Silicon powder (mean particle size of 40 ($\mu$m)) and boron carbide powder (mean particle size of 5 ($\mu$m)) were mixed in a weight ratio of 80:20 and then the mixture was mixed and dispersed in the dispersion medium to form the slurry.

The slurry was applied to the carbon substrate 1 at its part contactable with a hot metal and a cast steel block (a cross-hatched part in FIG. 1) by brushing. Thereafter, the solvent was evaporated at 300° C. in a drier. Further, the carbon substrate was increased in temperature to 1,600° C. in the induction heating furnace under $N_2$ gas atmosphere of 3 Torr for 4 hours and then was held therein for 30 minutes. Thereafter, the carbon substrate was cooled down and taken out. The SiC/C layer 3 was 6 mm in thickness. Thereafter, the SiC/C layer 3 was polished to Ra 0.75 ($\mu$m) by using abrasives to obtain a test die for continuous casting. The heat conductivity of the SiC/C layer 3 was 95 kcal/hrm° C.

EXAMPLE 2

An isotropic graphite having the bulk density of 1.82 ($g/cm^3$), the mean pore radius of 1.7 ($\mu$m) the bending strength of 500 ($kgf/cm^2$) and the thermal conductivity of 60 kcal/hrm° C. (which is available from TOYO TANSO CO., LTD.) was used. In the following producing method, the same steps as in Example 1 were used to make a carbon/silicon carbide composite material of the same shape. The SiC/C layer 3 was 4 mm in thickness. Thereafter, the SiC/C layer was polished in the same manner as in Example 1 to obtain a test die for continuous casting. The heat conductivity of the SiC/C layer 3 was 60 kcal/hrm° C.

EXAMPLE 3

An isotropic graphite having the bulk density of 1.90 ($g/cm^3$), the mean pore radius of 2.0 ($\mu$m) the bending strength of 550 ($kgf/cm^2$) and the thermal conductivity of 120 kcal/hrm° C. (which is available from TOYO TANSO CO., LTD.) was used. In the following producing method, the same steps as in Example 1 were used to make a carbon/silicon carbide composite material of the same shape. The SiC/C layer 3 was 2 mm in thickness. Thereafter, the SiC/C layer was polished in the same manner as in Example 1 to obtain a test die for continuous casting. The heat conductivity of the SiC/C layer 3 was 115 kcal/hrm° C.

Comparative Example 1

Isotropic graphite of the same material and the same shape as in Example 1 (which is available from TOYO TANSO CO., LTD.) was used. The isotropic graphite was put in a reactor of 50 liter, together with 1,000 g of reactive gas material in which powder of silica rock and powder of metallic silicon were mixed at a weight ratio of 2:1, to be processed at 2,000° C. for 1 hour by the CVR method.

The surface layer of the graphite substrate was converted into silicon carbide to a depth of about 0.5 mm over the entire surface. Thereafter, the surface layer was polished in the same manner as in Example 1 to obtain a test die for continuous casting.

Continuous casting tests were conducted, using the tests dies obtained in Examples 1–3 and Comparative Example 1. Cupronickel (Cu 70:Ni 30) was used as the object to be cast, and a horizontal continuous casting apparatus was used as a test equipment. Test results are shown in FIG. 2.

Then, description on application examples to the sliding member will be given.

EXAMPLE 4

An isotropic graphite having the bulk density of 1.77 ($g/cm^3$) the mean pore radius of 1.5 ($\mu$m) and the bending strength of 450 (kgf/cm²) (which is available from TOYO TANSO CO., LTD.) was machined into a product form of φ 52.5/φ 42.5. It is noted that the measurement value found by the mercury porosimeter (which is half the cumulative pore volume measured at a contact angle of 141.30 between mercury and specimen and at a maximum pressure of 1,000 (kgf/cm³) was introduced as the mean radius of the pore. 8% aqueous solution with polyvinyl alcohol resin as a binder was used as a dispersion medium. Silicon powder (mean particle size of 40 (μm)) and boron carbide powder (mean particle size of 5 (μm)) were mixed in a weight ratio of 80:20 and then the mixture was mixed and dispersed in the dispersion medium to form the slurry. The slurry was applied to the carbon substrate at its necessary part (sliding part) by brushing and, thereafter, the solvent was evaporated at 300° C. in the drier. Further, the carbon substrate was increased in temperature to 1,600° C. in the induction heating furnace under $N_2$ gas atmosphere of 3 Torr for 4 hours and then was held therein for 30 minutes. Thereafter, the carbon substrate was cooled down and taken out. Thereafter, the carbon substrate was impregnated with antimony under pressure of 120 kg/cm² at 750 ° C.

EXAMPLE 5

Isotropic graphite having the bulk density of 1.82 (g/cm³), the mean pore radius of 1.0 (μm) and the bending strength of 780 (kgf/cm²) (which is available from TOYO TANSO CO., LTD.) was used. The same producing method as in Example 4 was used to convert a specific part (sliding part) of the graphite substrate into the SiC/C layer. Thereafter, the layer was impregnated with phenol resin under pressure of 20 kg/cm² at ordinary temperature.

EXAMPLE 6

Isotropic graphite having the bulk density of 1.90 (g/cm³), the mean pore radius of 0.15 (μm) and the bending strength of 950 (kgf/cm²) (which is available from TOYO TANSO CO., LTD.) was used. As is the case with the above Example, the specific part (sliding part) of the graphite substrate was converted into the SiC/C layer. Thereafter, the layer was impregnated with phenol resin under pressure of 20 kg/cm² at ordinary temperature.

Comparative Example 2

Isotropic graphite of the same material and the same shape as in Example 4 (which is available from TOYO TANSO CO., LTD.) was used. On the other hand, the slurry prepared in a similar manner without adding the boron carbide powder was used. In accordance with the same producing method, except the condition of being subjected to induction heating under atmospheric vacuum, the specific part (sliding part) of the graphite substrate was converted into the SiC/C layer. Thereafter, the layer was impregnated with antimony under pressure of 120 kg/cm² at 750° C.

Comparative Example 3

Isotropic graphite of the same material and the same shape as in Example 5 (which is available from TOYO TANSO CO., LTD.) was used. On the other hand, the slurry prepared in a similar manner without adding the boron carbide powder was used. In accordance with the same producing method, except the condition of being subjected to induction heating under atmospheric vacuum, the specific part (sliding part) of the graphite substrate was converted into the SiC/C layer. Thereafter, the layer was impregnated with phenol resin under pressure of 20 kg/cm² at ordinary temperature.

Comparative Example 4

Isotropic graphite of the same material and the same shape as in Example 6 (which is available from TOYO TANSO CO., LTD.) was used. On the other hand, the slurry prepared in a similar manner without adding the boron carbide powder was used. In accordance with the same producing method, except the condition of being subjected to induction heating under atmospheric vacuum, the specific part (sliding part) of the graphite substrate was tried to be converted into the SiC/C layer. It was found however that no SiC/C layer was formed.

Evaluations were made on the specimens obtained in Examples 4–6 and Comparative Examples 2–3 by observing their longitudinal sections and cross sections and by comparing the form depths of the SiC/C layers and compositions of their silicification parts. The compositions were examined by microphotographs and a surface analysis method (a computer imagery integration method). Thereafter, all specimens were further submitted to sliding property tests.

First, the examination results of the form depths of the SiC/C layers are shown in FIG. 3.

Figure 4:
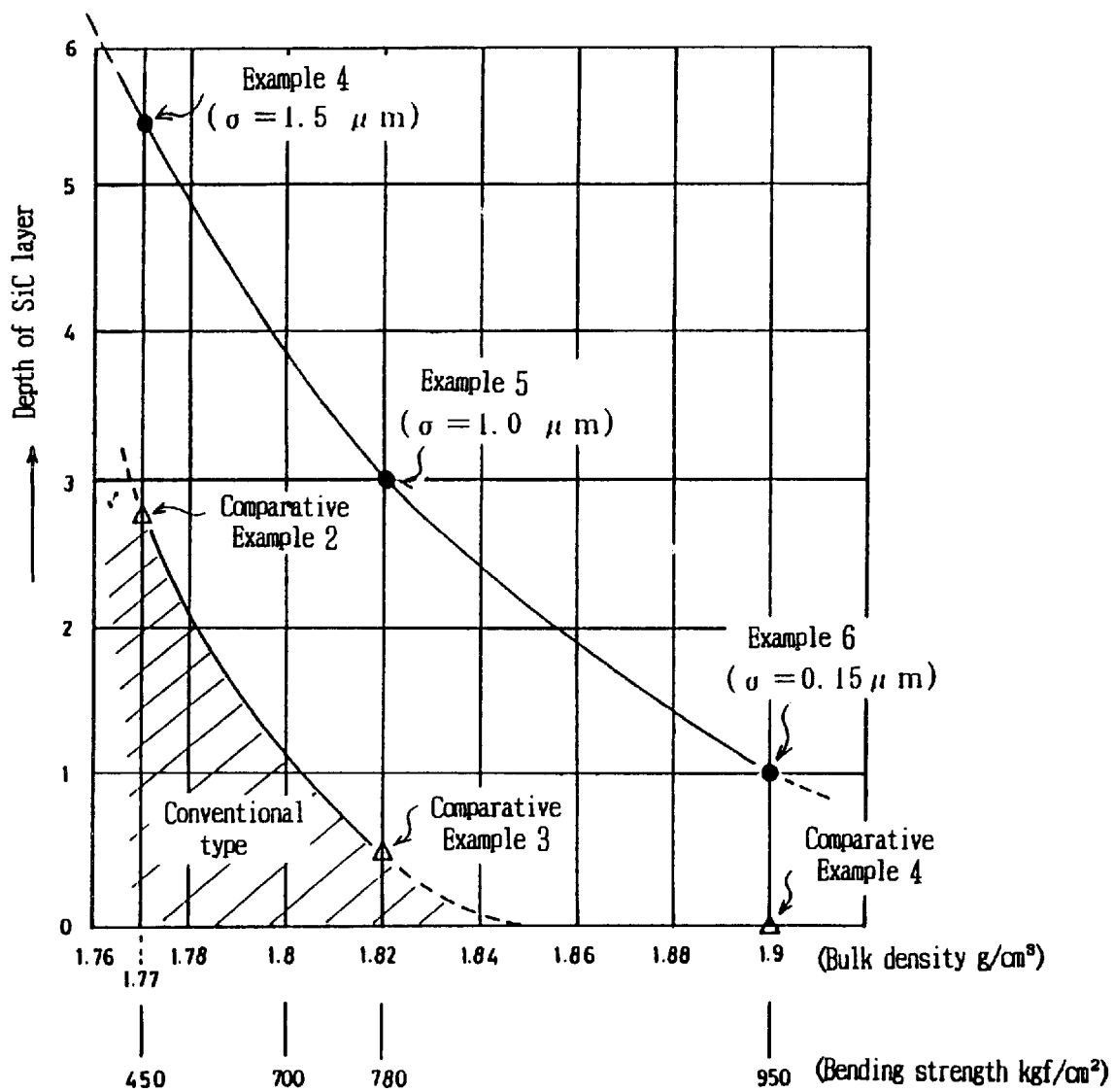
FIG. 4 is a diagram showing a relation between bulk density of the carbon substrate and the depth of a surface layer of the SiC/C layer.

Shown in FIG. 4 is a diagram as graphed with reference to FIG. 3, showing the relationship between the characteristic value of the carbon substrate used and the depth of the SiC/C layer of the obtained composite material. The bulk density and the bending strength are plotted in horizontal axis, and the depths of the SiC/C layers are plotted in vertical axis. As seen from FIG. 4, even when a high-intensity carbon substrate having the mean pore radius of 0.15 or more to less than 1.2 and the bending strength of the order of 700–1,000 (kgf/cm²) is used, the SiC/C layer can surely be formed thereon to a depth of not less than 1 mm practically required for the sliding part of the carbon substrate or the SiC/C layer can be formed thereon to a depth of about 3–4 mm, depending on the conditions.

There is almost no conventional type of material that can allow the SiC/C layer of not less than 1 mm to be formed on a high-intensity carbon substrate, which is within the range of the properties. With the inventive material, the SiC/C layer can surely be formed to a depth of not less than 1 mm. As far as the high-intensity carbon substrate having the bulk density of 1.77 (g/cm³), the mean pore radius of 1.5 (μm) and the bending strength of 450 (kgf/cm²) is concerned, the depth of the SiC/C layer of the conventional type of material is 2.8 mm, where as the form depth of the SiC layer of the inventive material is 5.5 mm. For example, if the assumption is made that the sliding property of the inventive material is identical to that of the conventional type of material, the inventive material can provide more than double life than the conventional type of material.

Figures 5, 6:
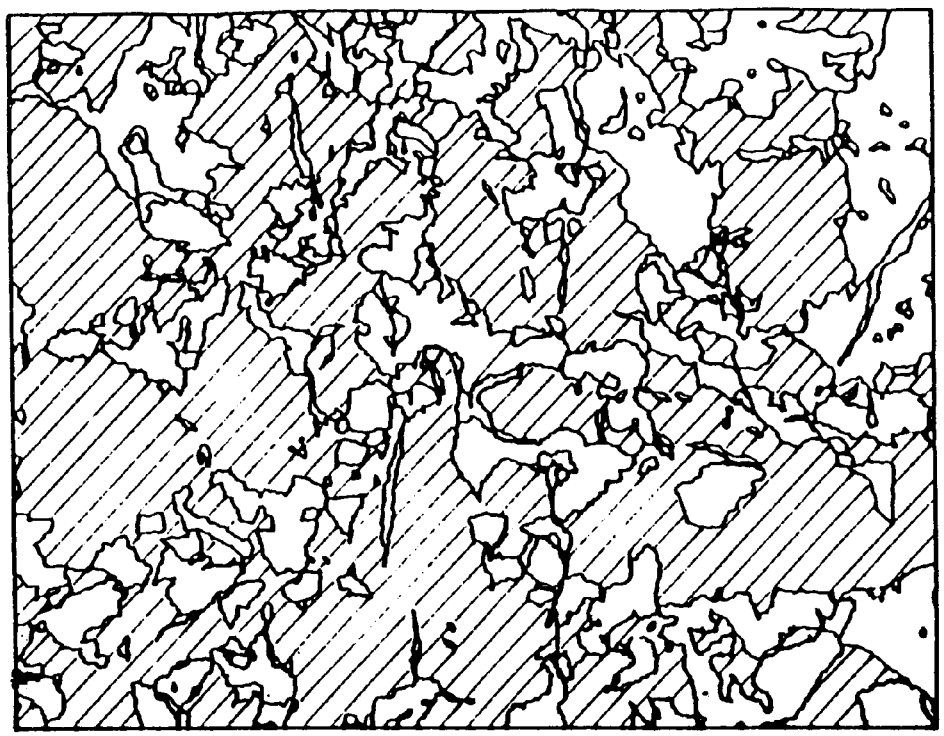
FIG. 5 is a diagram showing an analyze result of a surface of the SiC/C layer.
FIG. 6 is a diagram showing an area ratio of SiC to the SiC/C layer.

The surface analysis was conducted, taking Example 6 as a typical example. After the silicon carbide processed part of the specimen was buried in MMA (methyl methacrylate) as a preliminary treatment, the surface desired to be observed was polished and further carbon was evaporated on the polished surface. Measurements were made on the conditions of acceleration voltage of 20 KV, sample current of 0.6 nA and measuring time of 200 sec. A measuring device of EMAX-2700 (available from HORIBA) was used. Shown in FIG. 5 is a surface analysis photo of Si. In FIG. 5, a white part shows a SiC formation part and a crosshatched part shows a carbonaceous part. Shown in FIG. 6 is an area ratio of silicon carbide to carbon.

Figure 7:
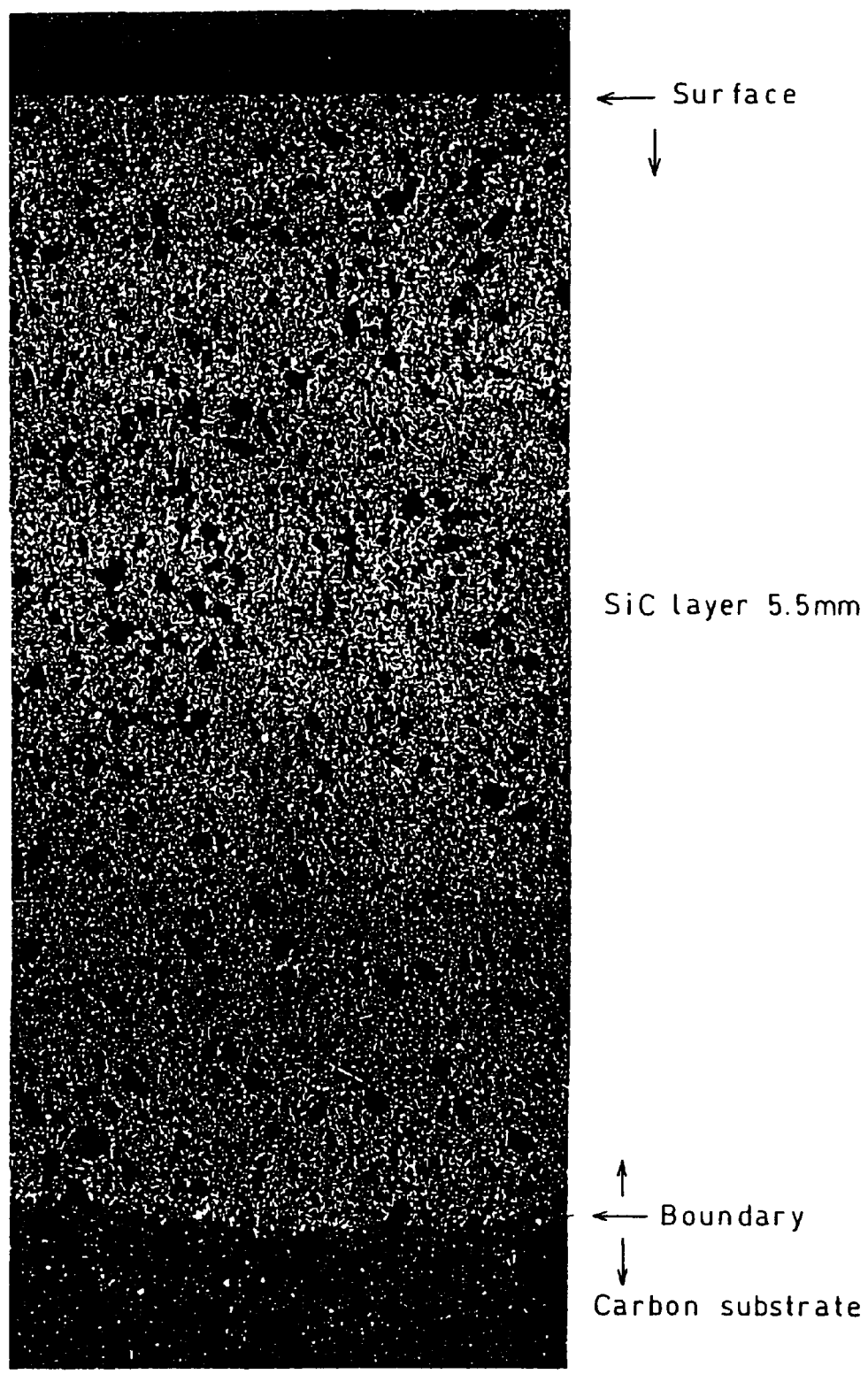
FIG. 7 is a microphotograph of a longitudinal section of the SiC/C layer formed portion of Example 4.
Figure 8:
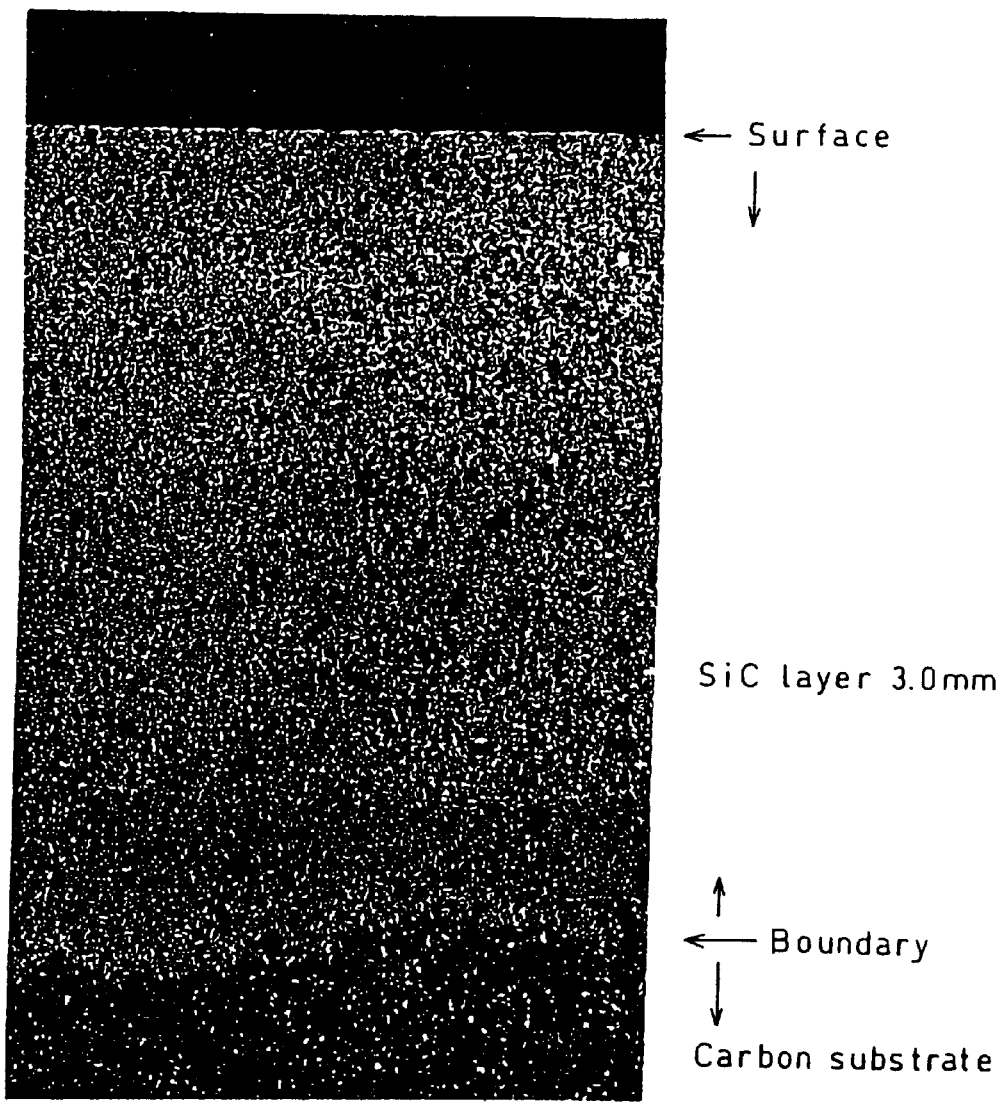
FIG. 8 is a microphotograph of a longitudinal section of the SiC/C layer formed portion of Example 5.
Figure 9:
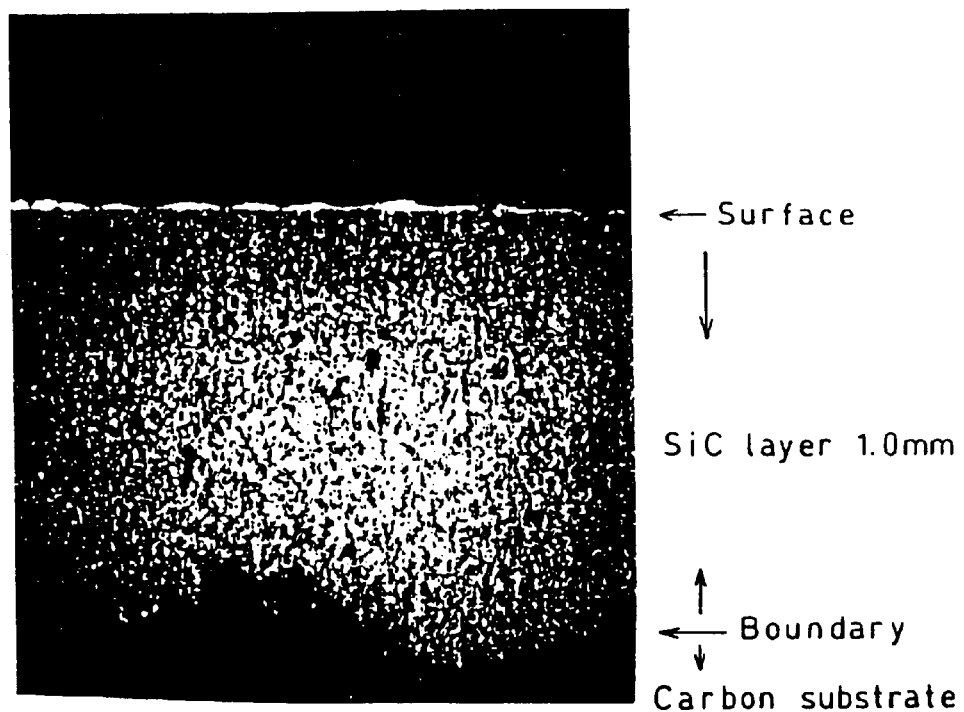
FIG. 9 is a microphotograph of a longitudinal section of the SiC/C layer formed portion of Example 6.

Further, microphotographs of longitudinal sections of the SiC/C layer formed parts in Examples 4, 5 and 6 are shown in FIGS. 7, 8 and 9, respectively.

The following facts became apparent from FIGS. 2 to 9. It was confirmed that even when a carbon substrate was used of the bulk density of 1.9 (g/cm$^3$), the mean pore radius of 0.15 ($\mu$m) and a very high mechanical strength that was considered to make it impossible to form the SiC/C layer itself, the SiC/C layer could be formed to a practical depth (not less than 1 mm). Also, it was confirmed that according to the inventive method, even when the same carbon substrate is used, the SiC/C layer was formed very deeply (more than two times) and simultaneously the homogeneous composition (SiC/C composition) was formed in the depth direction as well. The facts could be well understood from the microphotographs of the longitudinal sections of FIGS. 7–9, in particular.

Next, hollow cylindrical members (the outer diameter of 52.5 mm$\phi$×the inner diameter of 42.5 mm$\phi$×the height of 26.0 mm) were molded with respect to the respective specimens of Examples 4–6 and Comparative Examples 2–4. Upper surface sides of the hollow cylindrical members were impregnated with phenol resin so that they can be made impermeable and, thereafter, the evaluation was made by comparing their sliding properties by use of the sliding property testing machine under the same conditions.

Testing machine: Testing machine for a mechanical seal was used

Fluid pressure: 10 kgf/cm$^2$

Fluid: Water

Number of revolution: 3,600 r.p.m.

Counter material: SiC

Test time: 100 hr.

Fluid temperature: RT-30° C.

Specimen size: $\phi$52.5/42.5×26.0 mm

Balance ratio: 1.22

Test results are shown in FIG. 10. As seen from FIG. 10 as well, the specimens of Examples 4 to 6 could maintain the good sliding properties for a very long time, as compared with those of Comparative Examples 2 to 4.

The operation of the apparatus actually fitting thereto a mechanical seal of the hollow cylindrical member whose end surface or entire surface was subjected to silicification in accordance with the process of the present invention showed that the good sliding seal properties could be maintained for a longer time, as compared with the operation of the apparatus actually fitting thereto the conventional type of mechanical seal. Also, the operation of the apparatus fitting thereto a thrust bearing and a radial bearing of the hollow cylindrical member whose inside surface was subjected to silicification in a similar process showed that the good sliding seal properties could be maintained for a longer time, as compared with the operation of the apparatus actually fitting thereto the conventional type of bearing.

Capabilities of Exploitation in Industry

The carbon/silicon carbide composite material of the present invention having the construction can make use of its excellent wear resistance for members for continuous casting, such as a die, and sliding members, such as a mechanical seal, a bearing, a shaft, an inner wall of piston and cylinder, a piston ring, a thrust plate, a valve sliding part and a vane.

What is claimed is:

1. A carbon/silicon carbide composite material comprising an isotropic graphite substrate and a silicon carbide containing carbon layer, wherein the layer is formed by penetrating silicon and boron carbide from a surface of the substrate into the inside thereof to allow the silicon and carbon of the substrate to react with each other so as to be converted into silicon carbide under an inert atmosphere at a pressure of not more than 5 Torr and in which the silicon carbide is dispersed generally uniformly along a depth direction, the silicon carbide containing carbon layer having a thickness of not less than 3 mm.

2. The carbon/silicon carbide composite material according to claim 1, wherein the silicon carbide containing layer is formed by the surface of the isotropic graphite substrate being coated with slurry of 95–50 weight % of silicon powder and 5–50 weight % boron carbide powder dispersed in resin and being heated at a temperature more than a temperature at which silicon in the slurry is fused.

3. The carbon/silicon carbide composite material according to claim 1, wherein the isotropic graphite substrate has characteristics of a bulk density of not less than 1.77 (g/cm$^3$), a mean pore radius of not more than 1.5 ($\mu$m) and a bending strength of not less than 450 (kgf/cm$^2$).

4. A sliding member comprising the carbon/silicon carbide composite material according to claim 3.

5. The carbon/silicon carbide composite material according to claim 1, wherein the isotropic graphite substrate has characteristics of a bulk density of not less than 1.80 (g/cm$^3$), a mean pore radius of not more than 1.2 ($\mu$m) and a bending strength of not less than 700 (kgf/cm$^2$).

6. A sliding member comprising the carbon/silicon carbide composite material according to claim 5.

7. The carbon/silicon carbide composite material according to claim 1, wherein the isotropic graphite substrate and the silicon carbide containing carbon layer are impregnated with metal or resin.

8. A mechanical seal comprising the carbon/silicon carbide composite material according to claim 7.

9. The carbon/silicon carbide composite material according to claim 1, wherein the silicon carbide containing carbon layer is formed on the entire surface of the isotropic graphite substrate and has gas permeability of 10$^{-5}$ to 10$^{-6}$ cm$^2$/s.

10. A mechanical seal comprising the carbon/silicon carbide composite material according to claim 9.

11. A method for producing a carbon/silicon carbide composite material comprising applying a slurry comprising of 95–50 weight % of silicon powder and 5–50 weight % boron carbide powder dispersed in resin on a carbon substrate, and heating the slurry at a temperature of not less than 1500° C. and under a pressure of not more than 10 Torr, thereby forming a silicon carbide containing carbon layer having a thickness of not less than 1 mm and dispersed generally uniformly along a depth direction from a surface of said substrate.

12. The method according to claim 11, wherein the resin is selected from the group consisting of polyamide-imide resin, polyvinyl alcohol resin, and polyamide resin.

13. The method according to claim 11, wherein the carbon substrate is a graphite substrate.

14. The method according to claim 13, wherein the graphite substrate is an isotropic graphite.

15. The method according to claim 13, wherein the graphite substrate has a bulk density of not less than 1.70 (g/cm$^3$), a mean pore radius of not more than 2.5 ($\mu$m), a bending strength of not less than 300 (kgf/cm$^2$) and thermal conductivity of not less than 50 (kcal/hrm° C.).

16. The method according to claim 13, wherein the graphite substrate has a bulk density of not less than 1.77 (g/cm$^3$), a mean pore radius of not more than 1.5 ($\mu$m) and a bending strength of not less than 450 (kgf/cm$^2$).

17. The method according to claim 13, wherein the graphite substrate has a bulk density of not less than 1.80

(g/cm$^3$), a mean pore radius of not more than 1.2 (μm) and a bending strength of not less than 700 (kgf/cm$^2$).

18. The method according to claim 13, wherein the graphite substrate and the silicon carbide containing carbon layer are impregnated with metal or resin.

19. The method according to claim 13, wherein the silicon carbide containing carbon layer is formed on the entire surface of the graphite substrate and has a gas permeability of $10^{-5}$ to $10^{-6}$ cm$^2$/s.

* * * * *